United States Patent
Noble

(10) Patent No.: US 10,089,108 B1
(45) Date of Patent: Oct. 2, 2018

(54) ARCHIVAL FORMAT FOR INCREMENTAL DEPLOYMENTS AND VERSION CONTROL

(71) Applicant: Amazon Technologies, Inc., Seattle, WA (US)

(72) Inventor: Matthew Roy Noble, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/742,693

(22) Filed: Jun. 17, 2015

(51) Int. Cl.
*G06F 9/44* (2018.01)
*G06F 9/445* (2018.01)
*G06F 8/71* (2018.01)
*G06F 8/65* (2018.01)

(52) U.S. Cl.
CPC . *G06F 8/71* (2013.01); *G06F 8/65* (2013.01)

(58) Field of Classification Search
None
See application file for complete search history.

(56) References Cited

U.S. PATENT DOCUMENTS

| | | | | |
|---|---|---|---|---|
| 6,349,408 | B1 * | 2/2002 | Smith | G06F 9/445 717/168 |
| 6,928,526 | B1 | 8/2005 | Zhu et al. | |
| 7,330,870 | B1 | 2/2008 | Davis et al. | |
| 8,396,839 | B1 | 3/2013 | Huang | |
| 8,726,264 | B1 * | 5/2014 | Allen | G06F 8/68 717/168 |
| 8,959,484 | B2 * | 2/2015 | Pinnix | G06F 8/71 717/124 |
| 9,229,693 | B1 * | 1/2016 | Batni | G06F 8/30 |
| 2004/0168165 | A1 * | 8/2004 | Kokkinen | G06F 8/68 717/168 |
| 2006/0031827 | A1 * | 2/2006 | Barfield | G06F 8/65 717/168 |
| 2007/0061782 | A1 * | 3/2007 | Schreiner | G06F 11/3688 717/124 |
| 2009/0210852 | A1 * | 8/2009 | Martineau | G06F 8/71 717/101 |
| 2010/0153324 | A1 | 6/2010 | Downs et al. | |
| 2011/0119653 | A1 * | 5/2011 | Culpepper | G06F 8/60 717/120 |
| 2011/0173618 | A1 * | 7/2011 | Laborczfalvi | G06F 9/468 718/100 |
| 2011/0191753 | A1 * | 8/2011 | Ghercioiu | G06F 8/61 717/132 |
| 2013/0174124 | A1 * | 7/2013 | Watters | G06F 8/71 717/122 |
| 2013/0231093 | A1 * | 9/2013 | Toy | H04W 4/00 455/414.1 |
| 2014/0237466 | A1 * | 8/2014 | Motta | G06F 8/65 717/173 |
| 2016/0103881 | A1 | 4/2016 | Gukal | |
| 2016/0139914 | A1 * | 5/2016 | Levi | G06Q 10/00 717/121 |
| 2016/0283556 | A1 | 9/2016 | Varakin et al. | |

* cited by examiner

*Primary Examiner* — Daxin Wu
(74) *Attorney, Agent, or Firm* — Davis Wright Tremaine LLP

(57) ABSTRACT

Computing systems executing applications may receive updates to the application from an update service. The update service may generate an update bundle including resources of the application. The update bundle may further include a manifest containing information identifying the resources and a location for the resources to be stored within the computing system. Additionally, the computing system may maintain a cache of previously received resources.

20 Claims, 8 Drawing Sheets

ARCHIVAL FORMAT FOR INCREMENTAL DEPLOYMENTS AND VERSION CONTROL

BACKGROUND

The use of network computing and storage has proliferated in recent years. The resources for network computing and storage are often provided by computing resource providers who leverage large-scale networks of computers, servers and storage drives to enable clients, including content providers, online merchants and the like, to host and execute a variety of applications and web services. Content providers, online merchants and developers, who traditionally used on-site servers and storage equipment to host their websites and store and stream content to their users, often forego on-site hosting and storage and turn to using the resources of the computing resource providers. The usage of network computing allows content providers and online merchants, among others, to efficiently and adaptively satisfy their computing needs, whereby the computing and storage resources used by the content providers and online merchants are added to or removed from a large pool provided by a computing resource provider as needed and depending on their needs.

In addition, various software development projects (e.g., application developed by content providers, online merchants and developers) may have multiple contributors modifying source code associated with the software development project at any given time. Furthermore, other software development projects may require collaboration between multiple software development teams which may be geographically disbursed from one another and/or the computing resources of the service provider. Software development projects may also contain software code, data objects, compressed data objects, and encoded data objects that may be distributed over geographically distinct computer system. As a result, computing systems executing source code of the software development project may execute different versions of the same software development project. These problems may lead to delays and inefficiencies in the software development cycle. Furthermore, different versions of the same software development projects may not be compatible or may generate unexpected results.

BRIEF DESCRIPTION OF THE DRAWINGS

Various embodiments in accordance with the present disclosure will be described with reference to the drawings, in which.

DETAILED DESCRIPTION

Figure 1:
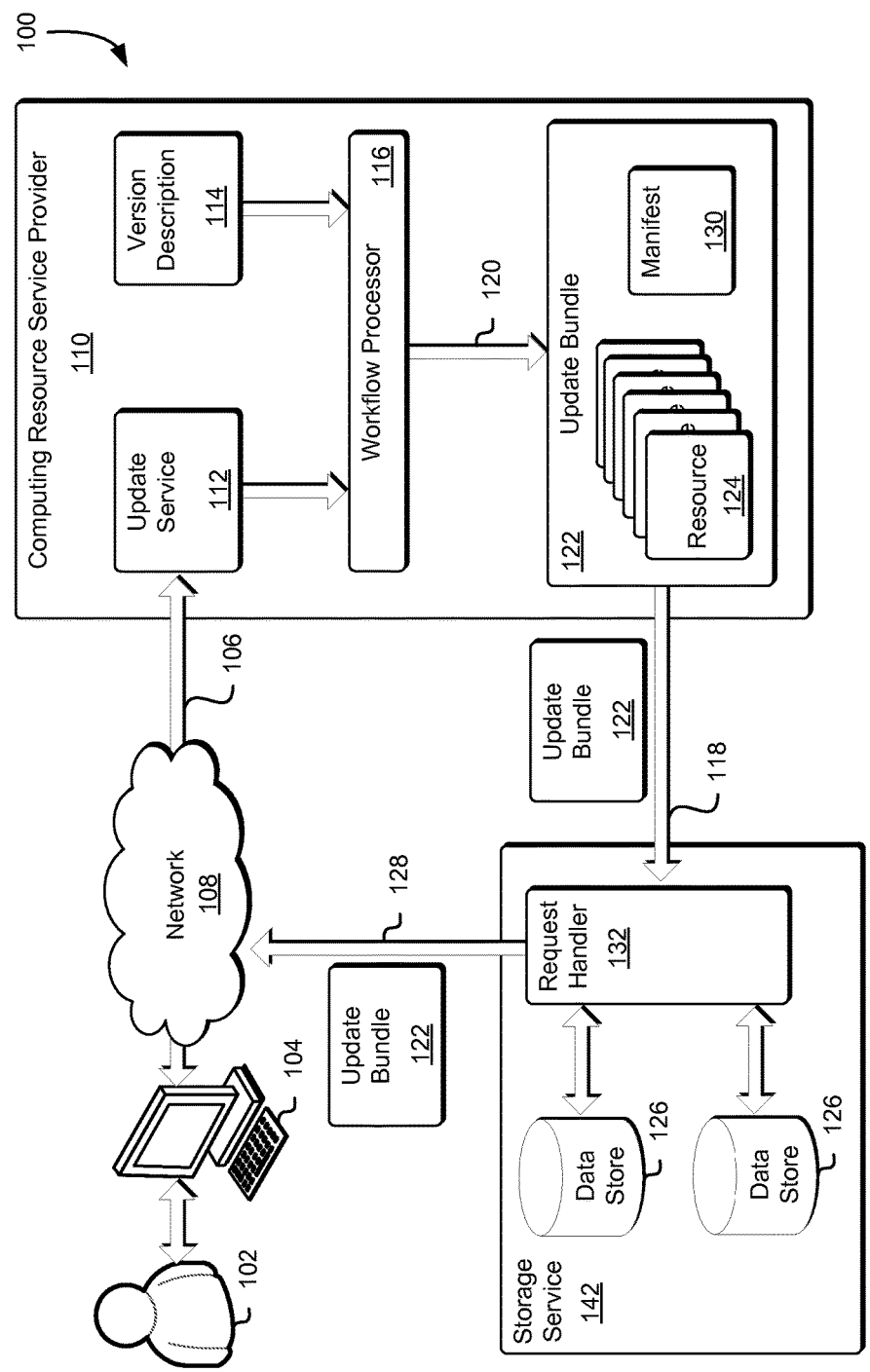
FIG. 1 is an environment illustrating an update service configured to provide computing system with update bundles of a software development project on behalf of a customer in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to improvements in software development and incremental deployment and update of software applications associated with software development projects. A computing resource service provider may provide software developers (also referred to simply as developers) with access to an update service configured to generate update bundles and distribute the update bundle to computing systems which may utilize the update bundle to update software applications, file system, file trees, data objects, file permissions, or any other resources associated with a software development project. The computing systems may be registered with the update service and may include an agent application or other logic or computer executable instructions configured to communicate with the update service and perform updates using the update bundles. For example, the computing systems may be a collection of web-servers executing an application front end associated with a software development project. The agent applications executed by the computing systems may be responsible for transmitting version information to the update service and updating the application front end on behalf of the computing system.

Furthermore, the computing system may have previously received an update bundle including a particular version of the software application and/or the file system, which may be stored in a cache by the agent. In various embodiments, the different computer systems have different versions of various applications, source codes, executable instructions, or files included in the update bundle. Additionally, the update service may include or have access to a source code repository or version control system from which the different versions of the files may have been obtained. The agent of the computing system may maintain information corresponding to the particular version of the software development project the computer system is executing. This information may be provided to the update service and the update service may have the lowest version common to all computing systems executing the application associated with the software development project. In this manner the update service can determine a single update bundle configured to update the computer system to the same version of the application associated with the software development project. The update bundle may be a compressed archive of the source codes, files, or other resources included in the update, such as a ZIP or TAR file format.

Furthermore, the update bundle may include a manifest or other file indicating to the agent executed by the computing system information suitable for applying the update to the computing system. The manifest may contain a list of all resources included in the update bundle, location information corresponding to the resources, version information corresponding to the resources to be used in the update, and other information corresponding to the resources such as metadata, permissions, resource types, and any other information usable in updating a file system or application. The manifest may be a data structure or other file format containing a set of resource descriptors and location information for the resources in the file system or application. For example, the manifest may be a JAVASCRIPT Object Notation (JSON) file format or other suitable data structure.

The location information may also include a location of the resource (e.g., location in the update bundle) or means for the agent to obtain the file (e.g., a remote storage location or local cache). For example, the location information may include a location in the update bundle where the resource is stored and a location in a file system of the computing system where the resource is to be stored. In another example, the location information may indicate a pervious update bundle and/or archive where the resource is located. In these embodiments, the agent may obtain the resource from the local cache or previously received archive which may be stored by the computing system processing the update bundle. The resource location information (e.g., file paths for the resources) may be unique with respect the file system, update bundle, and update service. The update service may ensure that the resource location information is unique for each update bundle corresponding to an application or a file system generated by the update service. During the update process, the agent executed by the computer system processes the manifest to determine which resources to load from cache and which resources to copy from the update bundle to the output location.

FIG. 1 illustrates an example environment 100 where update bundle 112 may be used to update resources 124 of a computer system client device 104, where the resources 124 are associated with a software development project in accordance with an embodiment. A developer 102 may connect 106 to an update service 112 through the computer system client device 104 and may initiate a connection with and/or interaction with one or more computing resources 124 under the control of the update service 112 or a computing resource service provider 110. The update service 112 may be operating within the computing resource service provider 110 environment or may be at least partially hosted on resources outside of the computing resource service provider 110 environment. The computer system client device 104 may include personal computers, cell phones, handheld messaging devices, laptop computers, tablet computers, personal data assistants, embedded computer systems, electronic book readers, and the like. The update service 112 may provide developers 202 with a source code repository of other version control systems for software development projects as well as provide update bundles 122 containing update information (e.g., particular versions of resources 124 associated with the software development project) for an agent executed by the computer system client device 104. In various embodiments, the developers 102 connect 128 directly with a storage service 212 in order to obtain the update bundle 122 including update information to various resources 124 of the computer system client device 104, such as source code files and other data objects, as described above. The storage service 142 may include one or more computing resources under the control of the update service 112 or a computing resource service provider 110.

Connections 106 and 128, in some embodiments, may be established via one or more networks 108 and/or entities associated therewith, such as servers connected to the network, either directly or indirectly. The computer system client device 104 that may request access to the build service 112 may include any device that is capable of connecting with a computer system via a network, including at least servers, laptops, mobile devices such as smartphones or tablets, distributed computing systems and components thereof, abstracted components such as guest computer systems or virtual machines and/or other types of computing devices and/or components. The network may include, for example, a public network such as the Internet, a wide-area network, a wireless network or a mobile network. The network may also operate in accordance with various protocols, such as those listed below, WiFi, cellular network protocols and/or others.

The computing resource service provider 110 may implement the storage service 142 configured to provide block-level and/or on-demand storage for developers 102 and other customers of the computing resource service provider 110. The storage service 142 may be a collection of computing resources configured to synchronously process requests to store and/or access data on one or more block-level storage devices or other suitable devices for storing data objects including resources 124 associated with a software development project as described above. The storage service 142 may operate using computing resources (e.g., databases) that enable the storage service 142 to locate and retrieve data quickly, so as to allow data to be provided in response to requests for the data. For example, the storage service 142 may maintain stored data in a manner such that, when a request for an update bundle 112 is retrieved, the update bundle 112 can be provided (or streaming of the update bundle 112 can be initiated) in a response to the request. For example, the storage service 142 or components thereof, such as data stores 126, may be configured to stream the update bundle 112. In some embodiments, at least a portion of the computing resources of the storage service 142 including the data stores 126 may be operated by the update service 112.

As noted, data stored in the storage service 142 may be organized into archives including update bundles generated at least in part by interactions of the agent executed by the computer system client device 104 with the update service 112. The update bundle 122 may have arbitrary sizes except, perhaps, for certain constraints on size. Thus, the storage service 142 may store numerous update bundles 122 of varying sizes. The storage service 142 may operate as a key value store that associates update bundles 122 with identifiers of the update bundles 122 which may be used by the agent executed by the computer system client device 104 to retrieve or perform other operations in connection with the update bundles 122 stored by the storage service 142.

Furthermore, the update bundles 122 may be compressed or encoded to reduce the amount of network traffic transmitted to the storage service 142 and the computer system client device 104. For example, the update service 112 may cause a workflow processor 116, described in greater detail below, to generate an archive of a particular software development project maintained in the source code repository implemented by the update service 112. A version description may be provided to the workflow processor 116. The version description may indicate particular versions of resources 124 and particular resources 124 to include in the update bundle 122. The version description may be generated based at least in part on version information obtained from the agent executed by the computer system client device 104.

The storage service 142 may contain one or more data stores 126 configured to store update bundles 122 as described above. The one or more data stores 126 may be virtual or physical storage devices such as hard disk drives. In order to enable access to update bundles 122 stored in the one or more data stores 126, the storage service 142 may contain a request handler 132. The request handler 132 may include a web-server frontend, service frontend, or other computer system configured to interface with one or more other computer systems. The request handler 132 may maintain the key value store responsible for associating update bundles 122 with identifiers of the update bundles 122. For example, the request handler 132 may receive a request from the computer system client device 104 including an identifier of a particular update bundle 122. The request handler 132 may then retrieve the particular update bundle 122 based at least in part on the identifier and provide the particular update bundle 122 in response to the request.

The connection 106 may be used to issue one or more commands to perform one or more operations associated with the version description 114 and/or an existing update bundle 122. For example, operations may be issued from the update service 112 to be executed 120 by a workflow processor 116 to create the update bundle 122 described in the version description 114 in response to a command from the developer 102 and/or agent executed by the computer system client device 104 to generate the update bundle 122. In such an example, the workflow processor 116 may cause one or more resources 124 associated with the version description 114 to be obtained from a data store 126 for use with the update bundle. In various embodiments, the resources 124 are already created and stored on computing resources of the computing resource service provider 110 and the update service 112 makes the resources available to workflow processor 116 for archival and storage with the storage service 142. The workflow processor 116 may include compiler or other tool configured to generate data objects from source code.

The version description 114 may indicate the lowest common version between the computing system of the developer 102 such that the computer system of the developer 102 may be updated with a single update bundle 122. For example, resource "A" may have versions 1 through 5, however a particular computing system of the developer 102 may only have version 3 of resource "A." The version description 114 may then indicate that the update bundle should contain sufficient resources 124 to update version 3 of resource "A" to version 5. In another example, if all computing systems of the developer 102 contain the version 5 of resource "A," the version description may indicate that resource "A" may be excluded from the update bundle 122. Additionally, the workflow processor 116 may utilize the version description 114 to generate a manifest 130. The manifest may be a JSON file or other data structure indicating location information corresponding to resources 124 of the update bundle as described above. Manifest 130 may include human-readable text consisting of key-value pairs, such as resource descriptor and resource location.

Once received by the storage service 142, the request handler 132 may generate an identifier of the update bundle 122 and provide the identifier to the update service 112 or other service of the computing resource service provider 110. In various embodiments, the storage service 142 may be configured to provide the identifier of the update bundle 122 directly to the developer 102. For example, the update service 112 may transmit a request to the storage service 142 to store the update bundle 122, and the request may contain information configured to identify the developer 102 and/or software development project such that the storage service 142 may transmit to the developer 102 an indication of the identifier of the update bundle 122. In another example, the update service 112 may receive the identifier of the update bundle 122 and may provide the identifier to the developer 102 over connection 106. The developer 102 may then obtain the update bundle 122 from the storage service 142 based at least in part on the identifier of the update bundle 122 over connection 129. The identifier of the update bundle 122 may be a reference to information configured to provide a location of the compilation artifact such as a uniform resource locator (URL) or uniform resource identifier (URI). Additionally, the agent executed by the computer system client device 104 may execute the operations described herein on behalf of and without input from the developer. For example, the agent executed by the computer system client device 104 obtains update bundles 122 and requests update bundles 112 without input from the developer 102.

Figure 2:
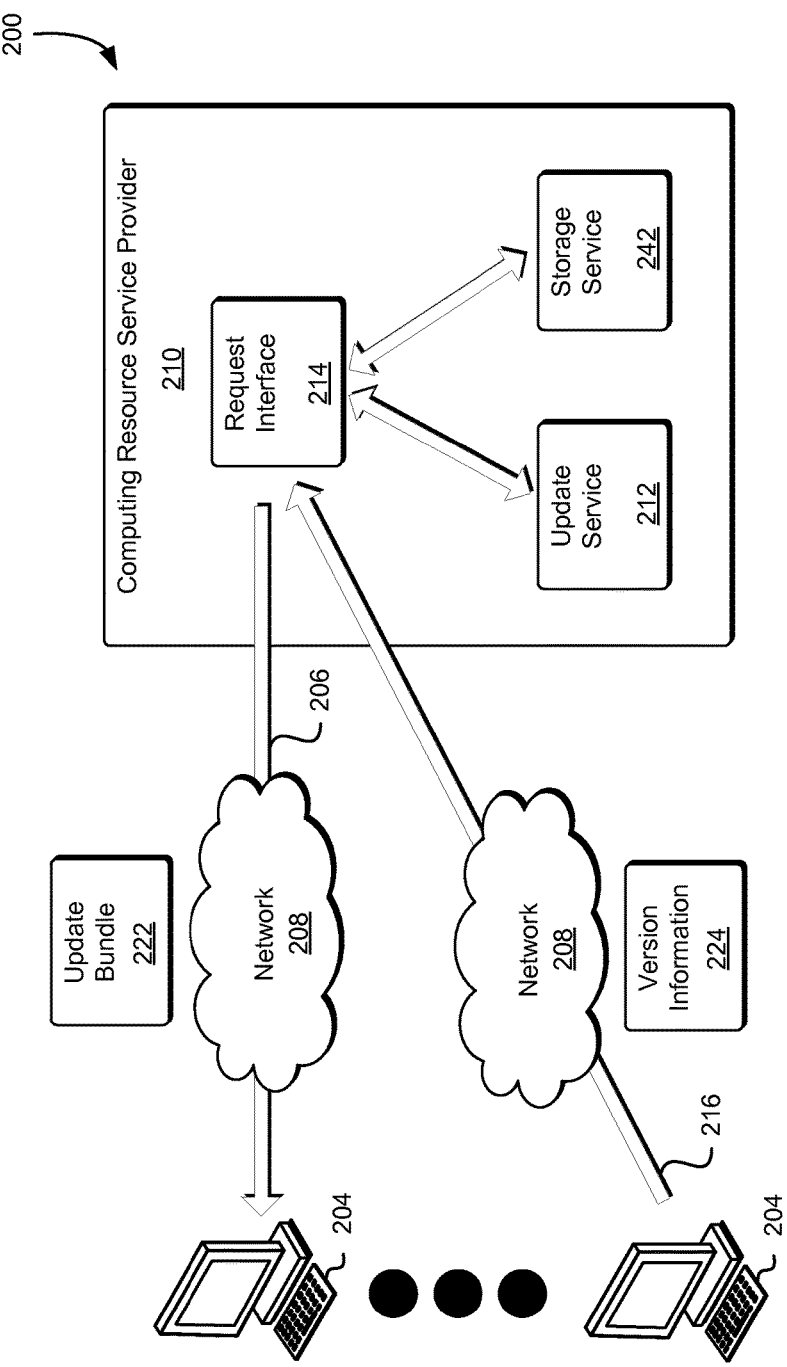
FIG. 2 is an environment illustrating an update service configured to provide computing systems with update bundles of a software development project on behalf of a customer in accordance with an embodiment.

FIG. 2 illustrates an environment 200 where an update service 212 is configured to provide computing systems 204 with update bundles 222 associated with a software development project or a particular version of a software development project in accordance with an embodiment. An agent executed by the computing system 204 may connect 206 to an update service 212 through a request interface 214 and may initiate a connection with and/or interaction with one or more computing resources under the control of the update service 212 or a computing resource service provider 210. The update service 212 may be operating within the computing resource service provider 210 environment or may be at least partially hosted on resources outside of the computing resource service provider 210 environment.

In various embodiments, the update service 212 may be configured to provide computing systems 204 with deployment bundles corresponding to particular versions of a software development project. For example, the update service 212 may provide the computer systems 204 with a update bundle configured to update a web-services application executed by a fleet of computer systems 204. The update service 212 may also provide customers with a source code repository of other version control systems for software development projects as well as provide update bundles 222, containing update information, to the agent executed by the computer system 204, as described above. In various embodiments, the agent executed by the computing system 204 may connect 216 with a storage service 242 in order to provide version information 224 to the storage service 242. The version information 224, described in greater detail below, may include a particular version of resources, such as source code files or executables, stored in cache of the computing system 204.

The agent and other applications of the computing systems may connect with the various services of the computing resource service provide 210 through a request interface 214. The request interface may be a web-services interface implemented by a web server or any other type of customer interface configured to receive requests and direct the received requests to computing resources capable of fulfilling the received requests. While FIG. 2 shows one request interface 214 for the services of the computing resource service provider 210, each service may have its own request interface 214 and, generally, subsets of the services may have corresponding request interfaces 214 in addition to or as an alternative to the request interface 214. The request interface 214 may also authenticate and authorize requests prior to providing the requests to services of the computing resource service provider 210.

The storage service 242 may include one or more computing resources under the control of the update service 212 or a computing resource service provider 210. The computing resource service provider 210 may implement the storage service 242 configured to provide block-level and/or on-demand storage for agent applications and customers of the computing resource service provider 210. The storage service 242 may be a collection of computing resources configured to synchronously process requests to store and/or access data on one or more block-level storage devices or other suitable devices for storing data objects including resources associated with a software development project as described above. The storage service 242 may operate using computing resources (e.g., databases) that enable the storage service 242 to locate and retrieve data quickly, so as to allow data to be provided in response to requests for the data. For example, the storage service 242 may maintain stored data in a manner such that, when a request for version information 224 is received, the version information 224 may be provided (or streaming of version information 224 can be initiated) in a response to the request. For example, the build service 212 or components thereof may be configured to obtain the version information 224 and determine a set of resources to include in the update bundle 222. In some embodiments, at least a portion of the computing resources of the storage service 242, including the data stores, may be operated by the update service 212.

The version information 224 may provide the update service with an indication of particular versions of resources maintained in cache of the computing systems 204 by the agent. For example, each data object of the software development project may have a unique identifier relative to the software development project. The version information 224 may contain the set of unique identifiers corresponding to the resources associated with the software development project available to the computing system 204. The version information 224 may include metadata or other information corresponding to the computing system 204 as well. For example, the version information 224 may contain a set of file permissions associated with the resources or other attributes of the computing system 204. The version information 224, update bundle 222, and other data transmitted between the computing systems 204 and the computing resource service provider 210 or component thereof over connections 206 and/or 216 may be transmitted via one or more networks 208 as described above.

Additionally, the version information 224 may indicate the latest checkpoint of the software development project updated by the agent or the last time the agent received and/or requested an update bundle 222. When determining a set of resources to include in the update bundle 222 the update service 212 may request the latest version information 224 from the agents or may obtain the version information 224 from the storage service 242 or other storage device. The version information 224 obtained by the update service 212 may include any information suitable for determining the set of resources to include in the update bundle such that the size of the set of resources is minimized (e.g., only the resources required to update each computing systems 204 to the appropriate version is included in the update bundle 222).

The build service 212 may then generate a manifest, as described above, indicating the set of resources included in the update bundle. Furthermore, the manifest may include metadata such as file permissions, file system attributes, read and/or write policies, or other information suitable for updating the computing systems. The agents executed by the computing systems 204 maintain information corresponding to the update bundles 222 which the agent has cached locally and provide version information 224 corresponding to the locally cached update bundles 222 to the update service 212 and/or storage service. Furthermore, the agent and/or update service 212 may generate checkpoints for the software development project in order to more efficiently manage versioning of the software development project. The update service 212 may then include only the resources that have been modified since the last checkpoint in the update bundle 222. For example, the update service 212 may calculate the update bundle 222 based at least in part on the delta between the latest checkpoint and the current state of the software development project. Furthermore, the update service 212 may perform journaling operations using the version information 224 and any request received to update the computing system 204. For example, for each update request and/or generated update bundle the update service 212 may update an journal with information corresponding to the resources that are new to the update bundle 222 (e.g., not included in a previous version of the update bundle). Furthermore, the checkpoints as described above may indicate the latest version of resources associated with the software development bundle. The computing systems 204 may then trace the journal to determine which update bundles contain the resources indicated in the checkpoint.

The update service 212 may generate an update bundle 222 for a particular computing system based at least in part on the version information 224 for the particular computing system or may generate an update bundle for a fleet of computing systems 204 based at least in part the version information 224 of the fleet of computing systems 204. In various embodiments, the computing systems 204 must register with the update service 212 in order to receive update bundles 222 from the update service 212. In yet other embodiments, the developer or customer of the computing resource service provider may indicate a set or fleet of computing systems 204 to be provided with a particular update bundle 222. For example, a request to obtain an update bundle 222 may indicate the set of computing systems 204 to provide with the requested update bundle 222. Additionally, the agent executed by the computing system may be responsible for requesting, receiving, and processing update bundles 222 on behalf of a developer.

Figure 3:
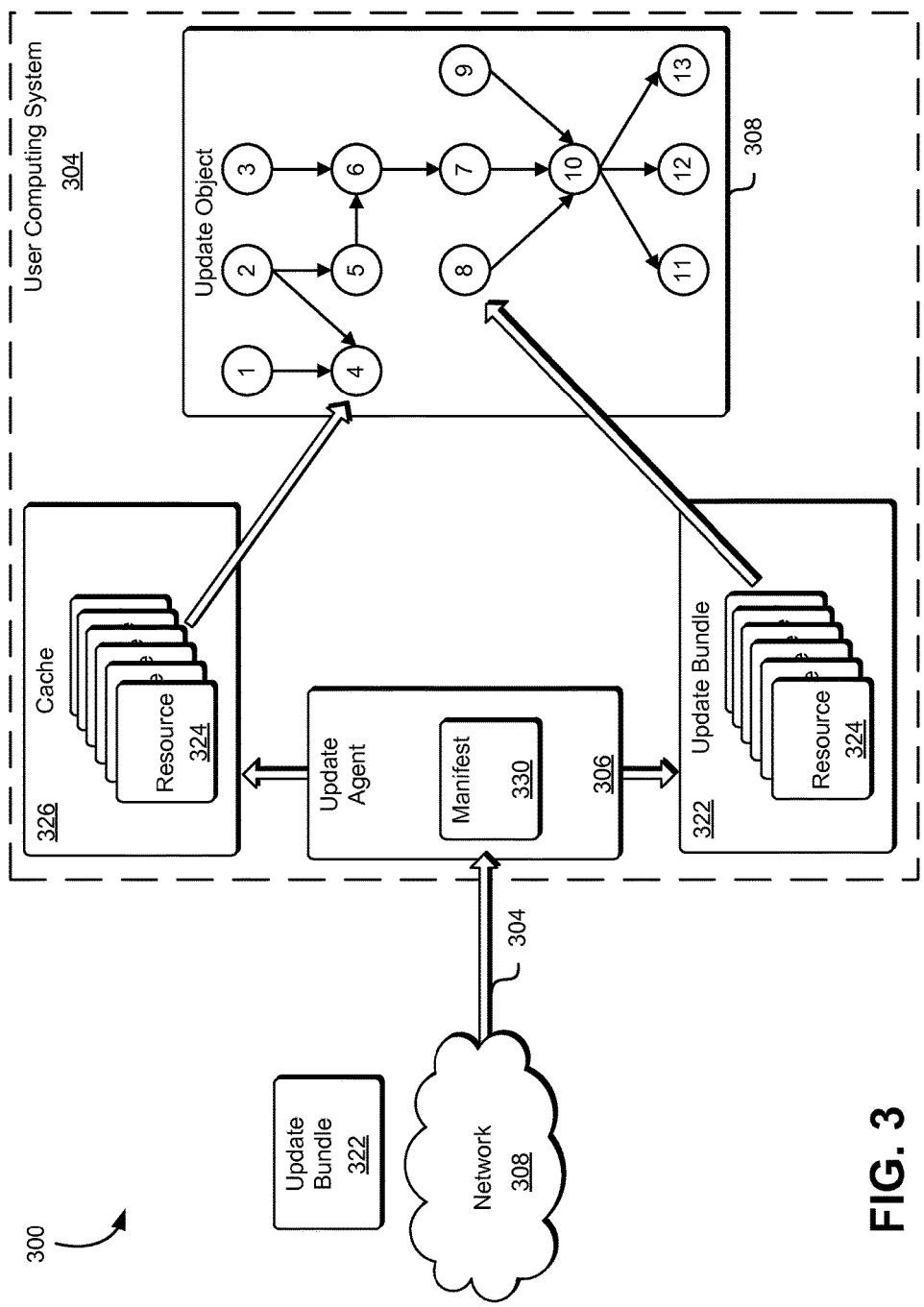
FIG. 3 is an environment illustrating a user computer system updating an application based at least in part on an update bundle received from an update service in accordance with an embodiment.

FIG. 3 illustrates an environment 300 where a user computing system 304 is configured to update an application executed by the user computing system 304 based at least in part on an update bundle 322 received from an update service in accordance with an embodiment. An update agent 306 may obtain the update bundle 322 over a connection 304 via one or more networks 308, as described above. The update agent may include logic, source code, or other executable instructions stored in memory of the user computer system 304. The update bundle 322 may include a set of resources 324 associated with a software development project and a manifest 330. The set of resources may include executable instructions and other data object included in a particular version of a software development project. The manifest 330 may be a data structure, such as a JSON file, indicating a resource ID, a storage location associated with a particular resource ID, and any other information suitable for storing on a storage device of the user computing system 304 the resources 324 included in the update bundle 322.

The update agent 306 may process the manifest 330 prior to generating an update object 308. Generating the update object 308 may include building the update object 308 or otherwise generating and storing the resources 324 in a file system, directory tree, or other data structure on a disk drive or other storage device of the user computing system 304. Processing the manifest 330 may include determining resources 324 already stored in cache 326 (e.g., received and stored in a previous update bundle 322) and resources 324 that are not included in the cache 326 which must be obtained from the update bundle 322. The cache 326 may include one or more storage devices, such as disk drives, optical storage devices and solid-state storage devices such as random access memory ("RAM") or read-only memory ("ROM"), as well as removable media devices, memory cards, or flash cards. In various embodiments, the update agent 306 may process the entire manifest 330 and store all the resources 324 required to generate the update object 308 in cache 326 prior to performing the update. For example, the update agent may determine if a particular resource 324 is already stored in cache 326 based at least in part on the manifest 330 and if the particular resource 324 is not already stored in cache 326 obtaining the particular resource 324 from the update bundle 322 and storing the particular resource 324 in cache 326. Additionally, the update agent 306 may cause the computing system 304 to obtain resources 324 directly from the update bundle 322. The computing system 304 or component thereof may then generate the update object 308 in order to update an application or other data object associated with the software development project being updated.

Figure 4:
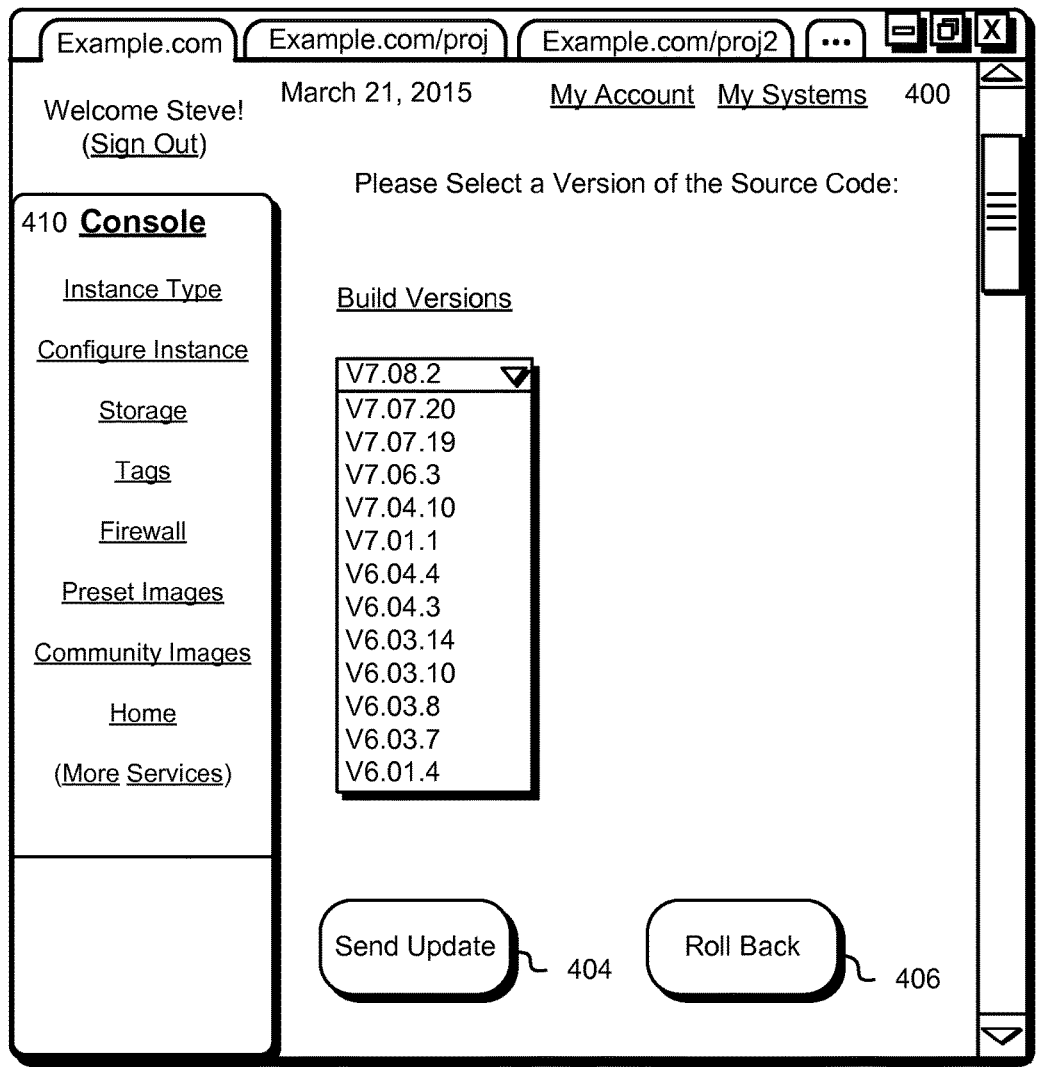
FIG. 4 is a diagram illustrating a management console exposed as a webpage in accordance with at least one embodiment.

FIG. 4 shows a webpage 400 which may be displayed by an application executed by a computing system enabling a user to interact with an update service operated by the computing resource service provider. As illustrated in FIG. 4, the webpage 400 includes various graphical user interface elements that enable users to update, roll back, or otherwise select a version of a software development project through a management console of which the webpage 400 is a part. In various embodiments, the user interacts with the update service by issuing commands to the through the management console. The webpage 400 may be displayed by various applications, such as a mobile application or web browser. In this example, the webpage 400 includes various navigational features. For instance, on the left-hand side of the webpage 400, various links 410 may link to one or more other webpages that contain additional content corresponding to a variety of different actions the user may cause to be performed.

The console pages may correspond to operations that may be taken to manage or otherwise control versions of the software development project managed by the update service or other computing services of the computing resource service provider. In this example, the links appear as textual words which enable the links to be selected using an appropriate input device such as a keyboard, mouse, touchscreen or other input device. Selection of one of the links 410 may cause an application displaying the webpage 400 to submit, pursuant to a URL associated with the selected link by the programming of the webpage 400, an HTTP request for the content associated with the link to a server that provided the webpage 400 or another server.

In this example, the webpage 400 also includes a graphical user element configured as a "send update" button 404. The send update button 404 may be a graphical user interface element of the webpage 400 where the underlying code of the webpage 400 is configured such that selection by an input device of the send update button 404 causes information corresponding to the selection of a particular build version of the software development selected on the webpage 400 to be transmitted as an update bundle to one or more computing systems. Furthermore, through the management console, the user may be guided through the process of selecting computing systems to receive the update bundle. The process may be divided into steps and the user may be prompted to provide information at each step. For example, the webpage 400 displays to the user a list of different types of computing systems suitable for receiving the update bundles. The user, using an input device, may select a set of computing systems to receive the update bundle. The user selection may be stored until the entire process is completed or the user selection may be transmitted to the update service upon selection of a graphical user interface element.

As illustrated in FIG. 4, the webpage 400 may contain a graphical user interface element configured as a dropdown list to display version information associated with the software development project. The version information may correspond to a particular version of one or more source files associated with the software development project and may include a version identifier. For example, the user may select a particular version of the software development project to generate a update bundle for or a checkpoint for. Furthermore, the version identifiers may be a unique identifier and a cryptographically secure identifier thereby providing at least some assurance that the version of the source file selected by the user is in fact the version of the source file obtained for the purposes of generating the update bundle. The management console of which webpage 400 is a part may also be configured such that the management console is connected to or responsible for a code repository as described above in connection with FIG. 1. For example, the management console may provide an interface for retrieving source code from the code repository and/or storing changes to the source code in the code repository.

The webpage 400 may also include a graphical user element configured as a "roll back" button 406. The roll back button 406 may be a graphical user interface element of the webpage 400 where the underlying code of the webpage 400 causes the application displaying the webpage 400 to transmit a command to the agent executing on the computing systems to restore a previous version of the software development project. In various examples, the management console may cause the command to roll back to be transmitted to the update service, the update service may then cause one or more agents to restore to the previous version of the software development project. Furthermore, the resources required to roll back to the previous version of the software development project may be stored in cache of the computing systems, as described above.

In this example, the webpage 400 contains a prompt asking the user to select a particular version of the source code associated with the software development project from a dropdown list. The version of the source code selectable using the webpage 400 may be included in webpage 400 based at least in part on user preference, popularity among users, features of the source code, features selected by the user, versions selected by the user, an administrator associated with the software development project, or other information suitable for selecting a version of a software development project. In various embodiments, the webpage 400 contains identifying information for portions of the software development project selectable by the user to generate an update bundle for updating one or more computing systems.

Once the user has made a selection using the webpage 400 and selected the send update button 404, the application displaying the webpage 400 may submit an HTTP request to the update service to generate an update bundle corresponding to the version of the source code selected by the user. The request may be transmitted to one or more servers of the update service operated by the computing resource service provider. Furthermore, the update service may obtain additional information from one or more other services in order to complete the request from the user. For example, the update service may obtain version information from a data storage service as described above in connection with FIG. 2. The update service may then determine a set of resources to include in the update bundle and generate a manifest based at least in part on the set of resources. In various embodiments, the update service or other service of the computing resource service provider returns, in response to the HTTP request from the user, identification information configured to identify the update bundle created in response to the user's HTTP request such that the user may obtain the update bundle based at least in part on the identification information.

Figure 5:
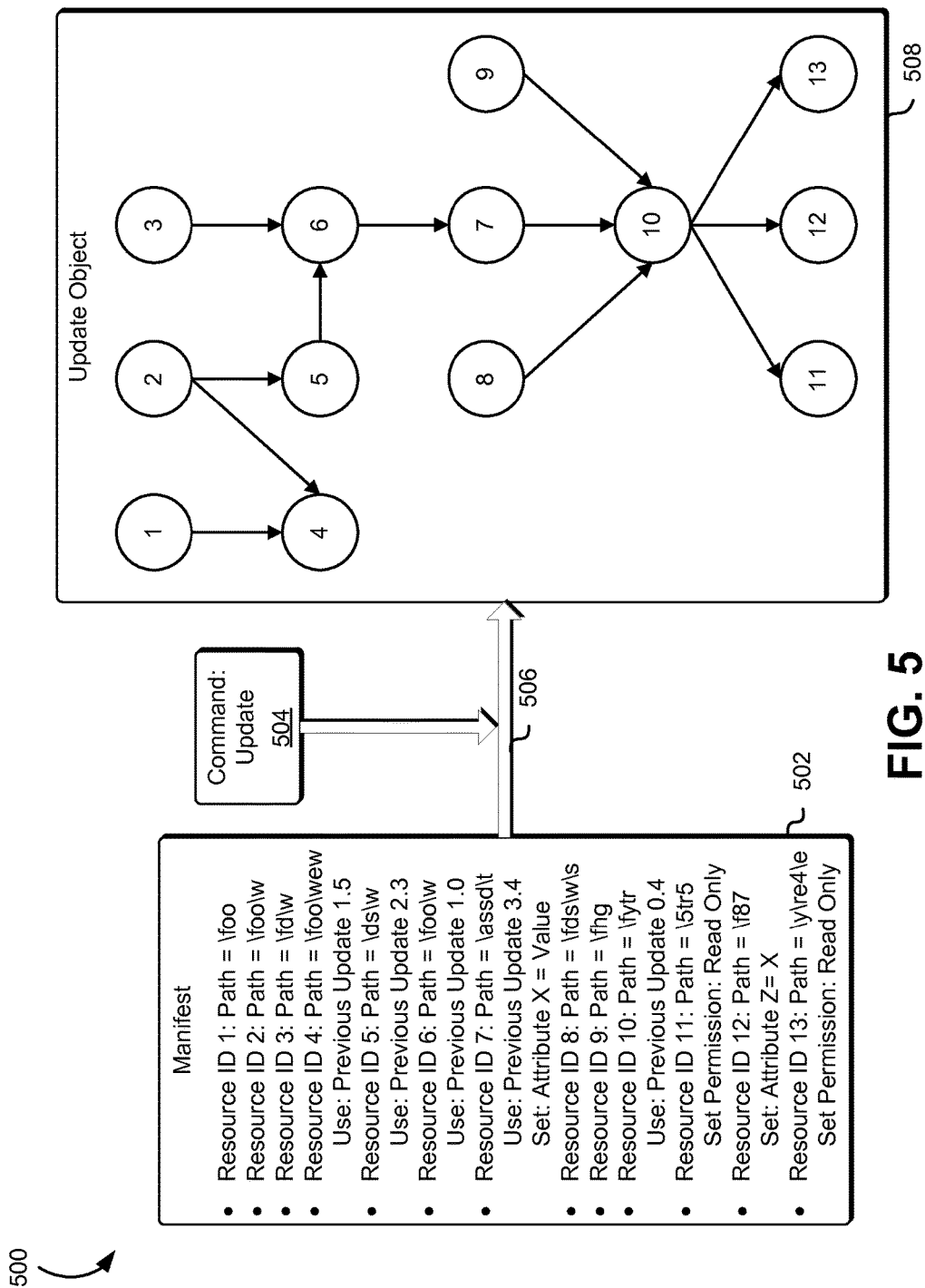
FIG. 5 is an environment illustrating an update bundle including a manifest defining attributes of one or more resources included in the update bundle in accordance with an embodiment.

FIG. 5 illustrates an example environment 500 where an update object may be generated by a computing system based at least in part on a manifest and resources included in an update bundle in accordance with an embodiment. An update bundle, including a set of resources and a manifest 502, and a command 504 may be received 506 by an agent executed by the computing systems described herein in connection with FIG. 3. In the example illustrated in FIG. 5, the command 504 is a command to update data objects associated with a software development project. The agent may create an update 508 based at least in part on the manifest 502 and the command 504 to update the software development project. In the update object 508, the nodes may be created with identifiers corresponding to the ID of the resource. For example, the resource with ID 1, on the first line of the manifest 502 corresponds to the node labeled "1" in the update object 508. Furthermore, the nodes represent storage of the resources at a particular path in a file system or directory structure as described above. In the description of FIG. 5, a node corresponding to a resource with a given ID and labeled with that ID may be referred to simply as node "ID" (so, for example, a node corresponding to a resource with ID "1" and labeled as such may be referred to simply as node "1").

In FIG. 5, node "1" through node "13" in update object 508 may correspond to the resources with ID 1 through ID 13. The dependency that resource ID 4 has on resource ID 1 is illustrated with the directed edge between node "1" and node "4" and the dependency that resource ID 4 has on resource ID 2 is illustrated with the directed edge between node "2" and node "4". The directed edge between node "1" and node "4" and the directed edge between node "2" and node "4" indicate that resource ID 1 and resource ID 2 must be created before resource ID 4 may be created. Similarly, resource ID 2 must be created before resource ID 4 may be created (dependency between node "2" and node "5"), resource ID 3 and resource ID 4 must be created before resource ID 6 may be created, resource ID 6 must be created before resource ID 7 may be created, and so on. The dependencies represented by the edges between nodes in the update object 508 correspond to the dependencies in the manifest 502. Nodes with incoming edges (node "4," node "6," node "7," node "10," node "11," node "12," and node "13" in the example illustrated in FIG. 5) represent resources that may be dependent on one or more other resources. Nodes without incoming edges (node "1," node "2," node "3," node "8," and node "9" in the example illustrated in FIG. 5) represent resources that may not be dependent on other resources.

Figure 6:
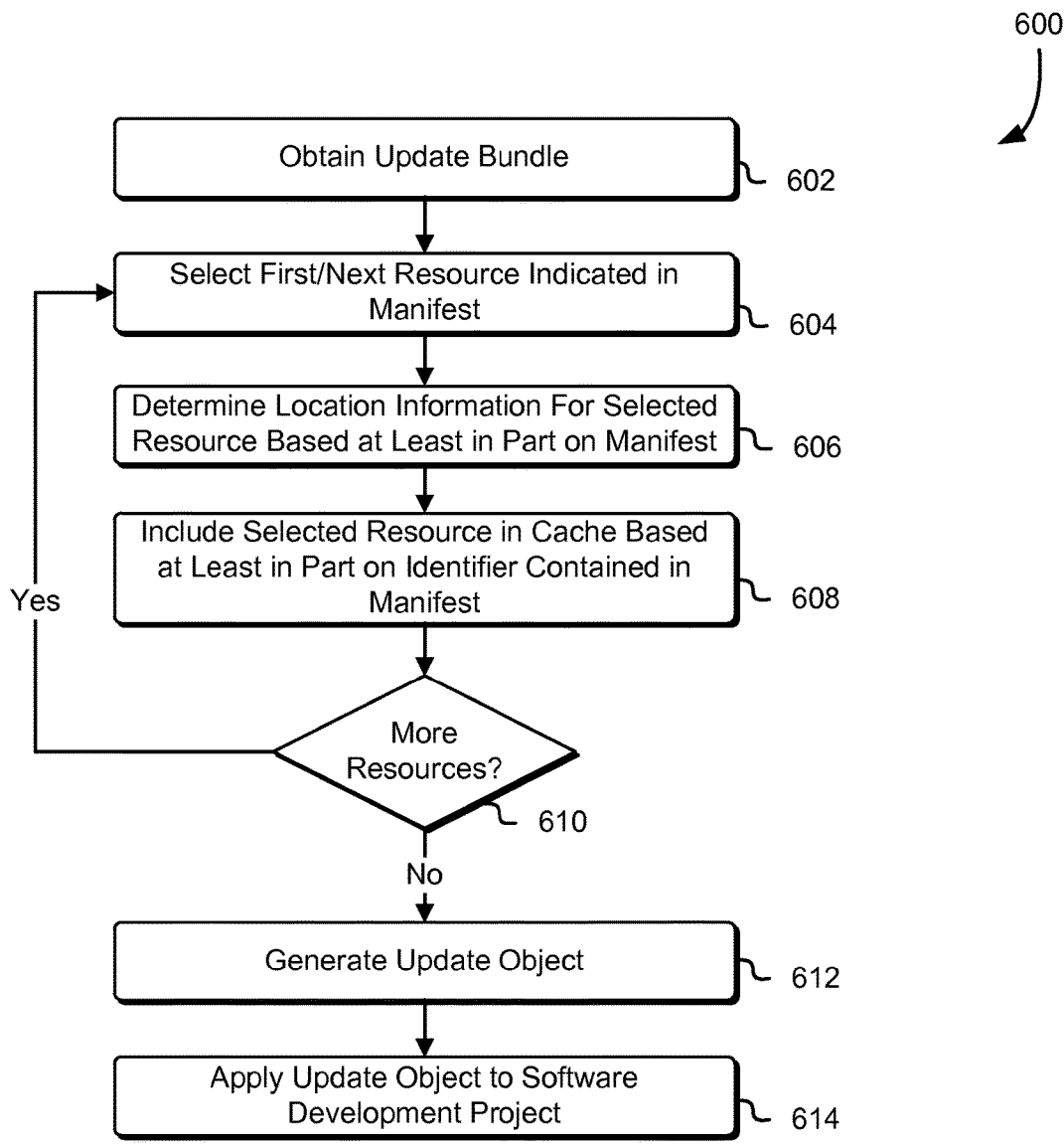
FIG. 6 shows an illustrative process for updating an application using an update bundle including a manifest in accordance with an embodiment.

In some embodiments, the update object 508 may be used to update an entire file system or directory structure of a software development project executed by the computing system. The manifest 502 and update object 508 may also correspond to a particular version of the software development project or source code of the software development project. The update service may also cache previous versions of an update bundle and use the previously cached update bundles to more efficiently generate a new update bundle. The new update bundle may be generated based at least in part on changes to the source file associated with the software development project. The previously cached update bundles may also provide a means for rolling back updates to the software development project FIG. 6 shows an illustrative example of a process 600 for applying an update included in an update bundle to a software development project in accordance with an embodiment. The process 600 may be performed by any suitable system such as by an agent executed by a computing system as described above. Generally, any computer system with access to an update bundle may perform the process 600 and variations thereof. In an embodiment, the system performing the process 600 obtains an update bundle 602. For example, the agent may request an update bundle from the update service as described above. In numerous variations to the process 600, the update bundle may be obtained at various intervals of time based at least in part on a schedule such as a deployment schedule and may be obtained automatically (e.g., without user input) by the agent.

Once the update bundle has been received, the system performing process 600 may process the update bundle by at least selecting the first/next resource indicated in the manifest 604. As described above, the update bundle may include a manifest indicating a unique ID for each resource in the update bundle and a location associated with each resource. The system performing process 600 may then determine the location information based at least in part on the manifest 606. Determining the location information may include determining whether the resource indicated by the ID in the manifest is already stored in cache of the computing system or must be obtained from the update bundle or other location. As described above, resources obtained from previously processed update bundles may be maintained in cache of the computing system.

The system performing process 600 may then include the selected resource in cache such that the selected resource may be obtained and/or include in the update bundle base at least in part on an identifier as indicated in the manifest 608. As described above, the identifier may be unique relative to the software development project (e.g., no two resources associated with the software development project may have the same identifier) and based at least in part on a location in a directory structure of the software development project. For example, the manifest may indicate a particular file path to store a particular resource and the system performing process 600 may then store the resource at the particular file path in cache. In this way the system performing process 600 may generate in cache a complete update object including a structure (e.g., file system, directory tree, or other data structure) of the resources included in the bundle. If there are additional resources indicated in the manifest 610 the system performing process 600 may select the next resource indicated in the manifest 604.

However, if no more resources are indicated in the manifest, the system performing process 600 may generate the update object 612. Generating the update object may include generating an intact file system based at least in part on the update bundle. The update object may be configured to update data objects associated with a software development project as described above. Once the update object is generate, the system performing process 600 may apply to the update object to the software development project 614. Applying the update object may include copying the update object from cache to a storage device of the computing system.

Figure 7:
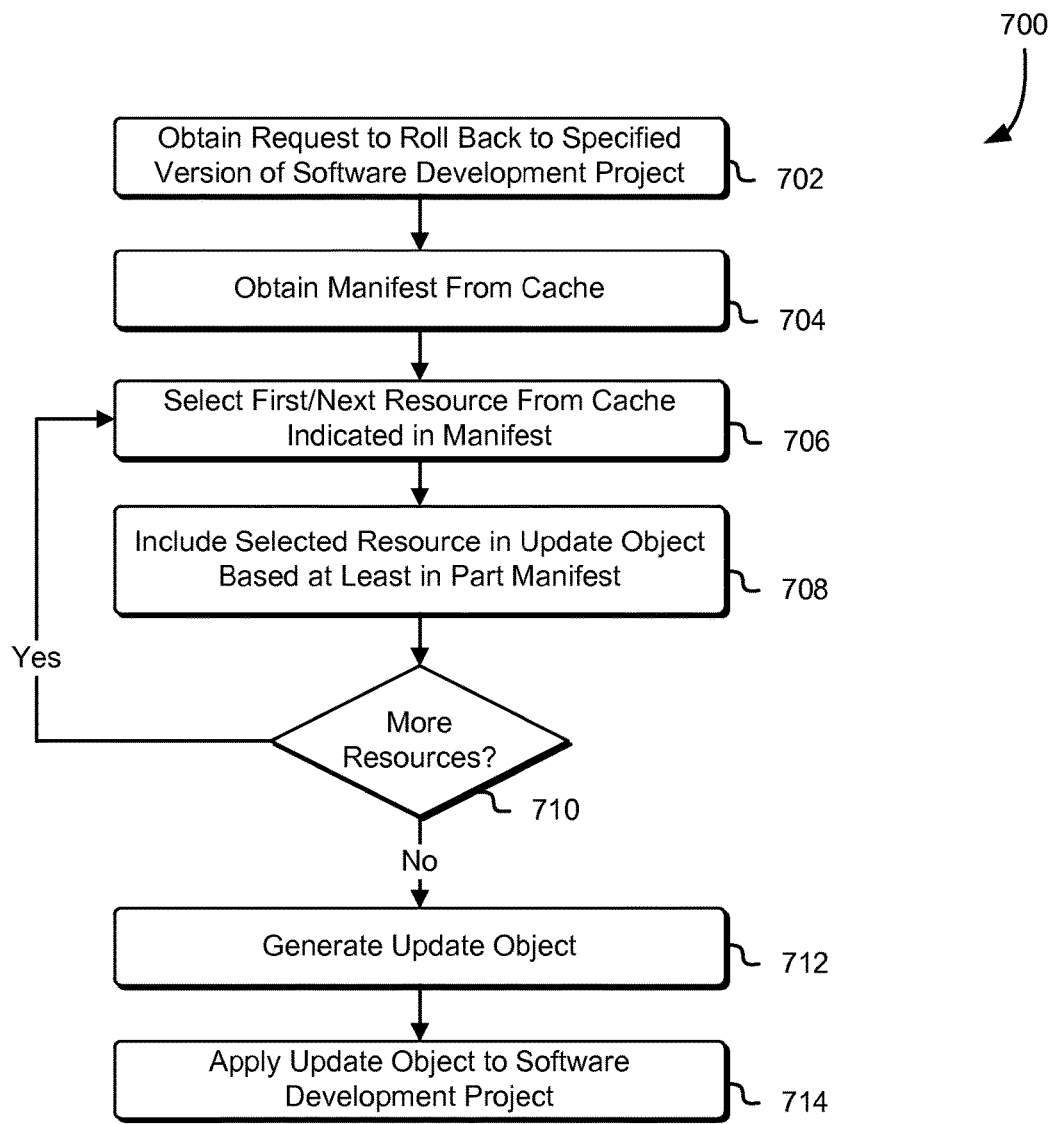
FIG. 7 shows an illustrative process for rolling back an application using a manifest in accordance with an embodiment.

FIG. 7 shows an illustrative example of a process 600 for restoring a previous version of a software development project based at least in part on a manifest stored in cache and obtained from a previously received update bundle in accordance with an embodiment. The process 700 may be performed by any suitable system, such as by an agent executed by a computing system as described above. Generally, any computer system with access to previously received update bundles may perform the process 700 and variations thereof. In an embodiment, the system performing the process 700 obtains a request to rollback an application to a specific version 702. For example, the agent may receive a request from the update service to restore a previous version of the software development project. The system performing the process 700 may then obtain a manifest associated with the specified version from a cache 704 maintained by the system performing the process 700. As described above, the system may be configured to maintain resources and manifests obtained from previously received update bundles. Additionally, the system or update service may generate checkpoints associated with the software development project which may enable efficient update and roll back.

Once the manifest has been obtained, the system performing process 700 may process the roll back request by at least selecting the first/next resource indicated in the manifest 706. As described above, the manifest may indicate a unique ID for each resource in the cache and a location associated with each resource. The system performing process 700 may then include the selected resource in an update object based at least in part on the manifest 708. The resources may be stored in the cache based at least in part on an identifier associated with the resource which enables the system to obtain the resource from cache based at least in part on information contained in the manifest. Furthermore, as described above, the manifest may include location information which may be used to place resources in an indicated location within the update object. The update object may be a file system or other data structure that may be stored on a storage device of a computer system to receive the roll back.

If there are additional resources indicated in the manifest 710 the system performing process 700 may select the next resource indicated in the manifest 706. However, if no more resources are indicated in the manifest, the system performing process 700 may generate the update object 712. Generating the update object may include generating an intact file system based at least in part on the update bundle. The update object may be configured to update data objects associated with a software development project as described above. Once the update object is generated, the system performing process 700 may apply to the update object to the software development project 714. Applying the update object may include copying the update object from cache to a storage device of the computing system.

Figure 8:
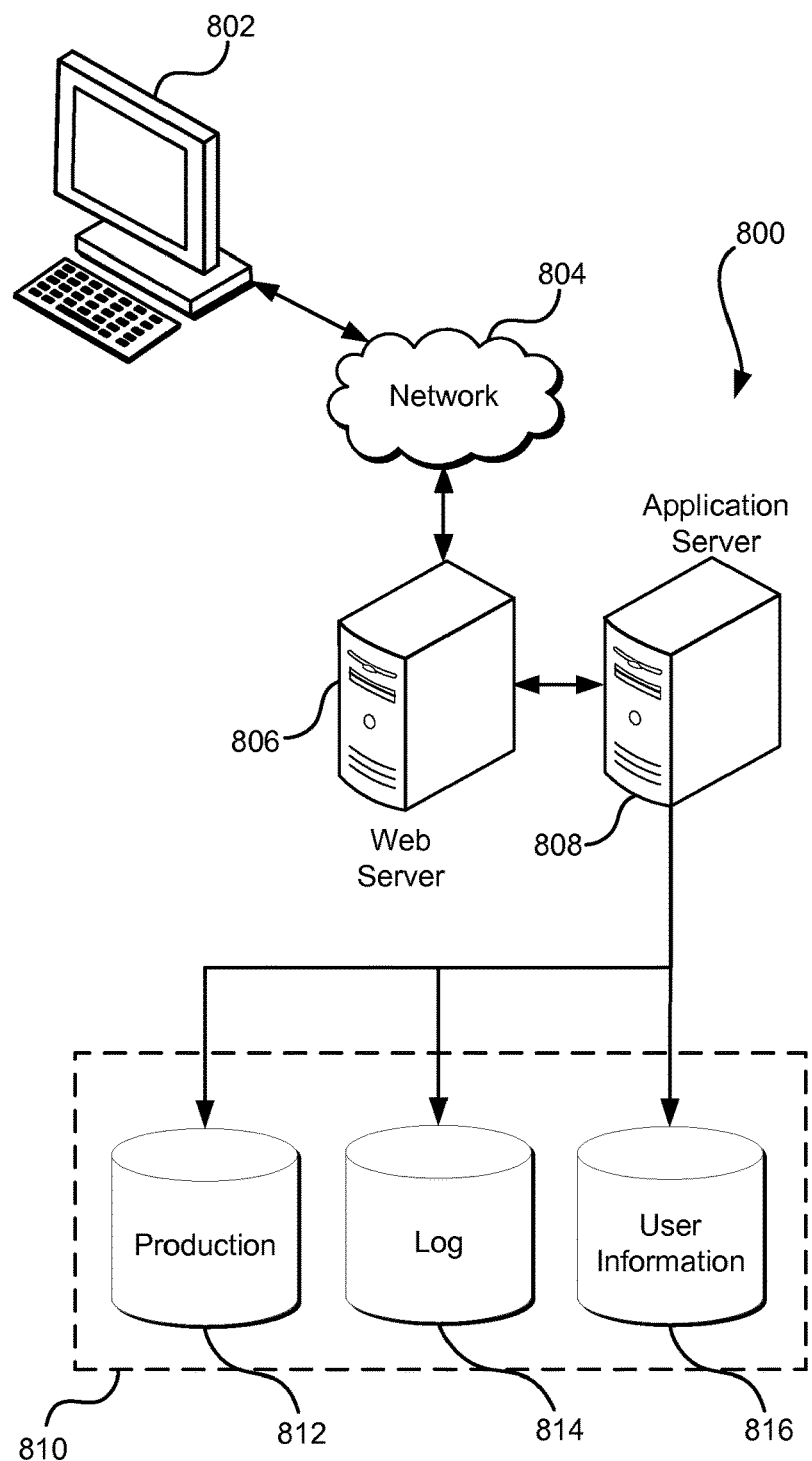
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), the JAVASCRIPT programming language, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), the PYTHON programming language, RUBY programming language, PERL programming language, JAVA programming language, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java® servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as the RUBY programming language, PHP, PERL programming language, PYTHON programming language or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or any other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining an update bundle that includes:
   identification of a build version of a software development project;
   a set of resources associated with the software development project, the set of resources including source code associated with the build version; and
   a manifest comprising:
   a data structure corresponding to the build version;
   location information for each resource of the set of resources; and
   dependency information associated with a dependency between a first resource of the set of resources and another resource of the set of resources;
   processing the update bundle by at least:
   determining, based at least in part on the data structure indicating prior processing of one or more previously received update bundles, a first set of the source code associated with the set of resources from a first cache associated with the prior processing;
   retrieving, based at least in part on the location information, a different second set of the source code associated with the set of resources;
   storing the first set and the second set of the source code in a second cache; and
   generating an update object based at least in part on the dependency information of the manifest and the first set and second set of the source code in the second cache; and
   executing, on a computer system including the software development project, the update object.

2. The computer-implemented method of claim 1, wherein the computer-implemented method further comprises transmitting information corresponding to a version of at least a portion of resources stored in the first cache, wherein the information causes determination, by an external update service, of a particular version of at least one resource of the set of resources contained in the update bundle.

3. The computer-implemented method of claim 1, wherein executing the update object further comprises generating a file system on a storage device of the computer system such that an application associated with the software development project utilizes the file system during execution of the application.

4. The computer-implemented method of claim 1, wherein the update bundle is an archive data object containing the set of resources in a compressed form.

5. A system, comprising:
   a cache containing one or more resources associated with a software development project, the one or more resources including source code from a source code repository; and
   memory to store instructions, if executed by one or more processors, cause the system to at least:
   receive, at an application, an update bundle corresponding to a newer build version of the software development project than that of the one or more resources in the cache, and containing:
   a set of resources; and
   a manifest identifying:
   location information for each resource of the set of resources; and
   dependency information associated with a dependency between a first resource of the set of resources and another resource of the set of resources;
   determine, based at least in part on the update bundle, different source code associated with the build version;
   add the different source code to the cache; and
   update, based at least in part on the dependency information of the manifest and the one or more resources and the different source code stored in the cache, the software development project to the newer build version.

6. The system of claim 5, wherein the manifest is a data structure containing at least key-value pairs, where the key indicates identification information for a particular resource of the set of resources and the value indicates location information for the particular resource of the set of resources.

7. The system of claim 5, wherein the update bundle comprises a minimum amount of resources associated with the software development project such that a fleet of computing systems of which the system is a member are updateable using the build version.

8. The system of claim 5, wherein each resource of the set of resources is identified based at least in part on identification information obtained from the source code repository.

9. The system of claim 5, wherein the memory further comprises instructions that, if executed by the one or more processors, cause the system to restore a previous version of the software development project based at least in part on the one or more resources and a previous manifest associated with the previous version of the software development project contained in the cache.

10. The system of claim 5, wherein the memory further comprises instructions that, if executed by the one or more processors, cause the system to transmit, to a storage device, version information associated with the one or more resources contained in the cache, wherein the version information is configured to enable an update service external to the system to determine a particular version of the set of resources to include in the update bundle.

11. The system of claim 5, wherein the manifest further comprises metadata associated with the set of resources contained in the update bundle, wherein metadata is configured to cause the system to modify one or more attributes of a particular resource of the set of resources including the source code from the source code repository.

12. The system of claim 11, wherein the metadata associated with the set of resources includes a set of permissions corresponding to the set of resources, wherein the set of permissions corresponding to the set of resources control access, by the system, to the set of resources including the source code from the source code repository.

13. A non-transitory computer-readable storage medium having stored thereon executable instructions that, if executed by one or more processors of a computer system, cause the computer system to at least:
   obtain an update bundle corresponding to a build version of a software development project, the update bundle including:
      one or more resources, and
      a manifest identifying:
         location information for source code associated with the one or more resources; and
         dependency information associated with a dependency between a first resource of the one or more resources and another resource of the one or more resources;
   determine a first subset of the source code obtained in a previously received update bundle corresponding to a previous build version;
   determine, based at least in part on the update bundle and the first subset of the source code, a different second subset of the source code;
   store the first and second subsets of the source code in a storage device of the computer system; and
   update the software development project to the build version based at least in part on the dependency information of the manifest and the stored first and second subsets of the source code.

14. The non-transitory computer-readable storage medium of claim 13, wherein the instructions that cause the computer system to update the computer system further include instructions that cause the computer system to update the software development project based at least in part on journaling information obtained from an update service separate from the computer system, where the journaling information indicates a third subset of the source code not included in a previous build version update bundle.

15. The non-transitory computer-readable storage medium of claim 13, wherein the instructions that cause the computer system to obtain the update bundle further include instructions that cause the computer system to obtain the update bundle based at least in part on an operation of an agent application executed by the computer system.

16. The non-transitory computer-readable storage medium of claim 13, wherein the instructions that cause the computer system to obtain the update bundle further include instructions that cause the computer system to obtain the update bundle based at least in part on an operation of user through an management console thereby causing a command to provide the update bundle to be transmitted to an update service responsible for creating the update bundle.

17. The non-transitory computer-readable storage medium of claim 16, wherein the instructions further comprise instructions that, if executed by the one or more processors, cause the computer system to transmit, to an update service separate from the computer system, information associated with a version number corresponding to at least a portion of the one or more resources.

18. The non-transitory computer-readable storage medium of claim 13, wherein the manifest further comprises a data structure including identifiers associated with the one or more resources and file system location information associated with the one or more resources.

19. The non-transitory computer-readable storage medium of claim 13, wherein the instructions further comprise instructions that, if executed by the one or more processors, cause the computer system to generate a checkpoint corresponding to a particular version of the software development project.

20. The non-transitory computer-readable storage medium of claim 13, wherein the instructions further comprise instructions that, if executed by the one or more processors, cause the computer system to delete at least some of the source code stored in the storage device based at least in part on a command received from an update service.

* * * * *